Dec. 10, 1957  M. MENDELSOHN  2,816,154
SEPARATOR FOR ELECTRIC BATTERIES
Filed Oct. 17, 1951
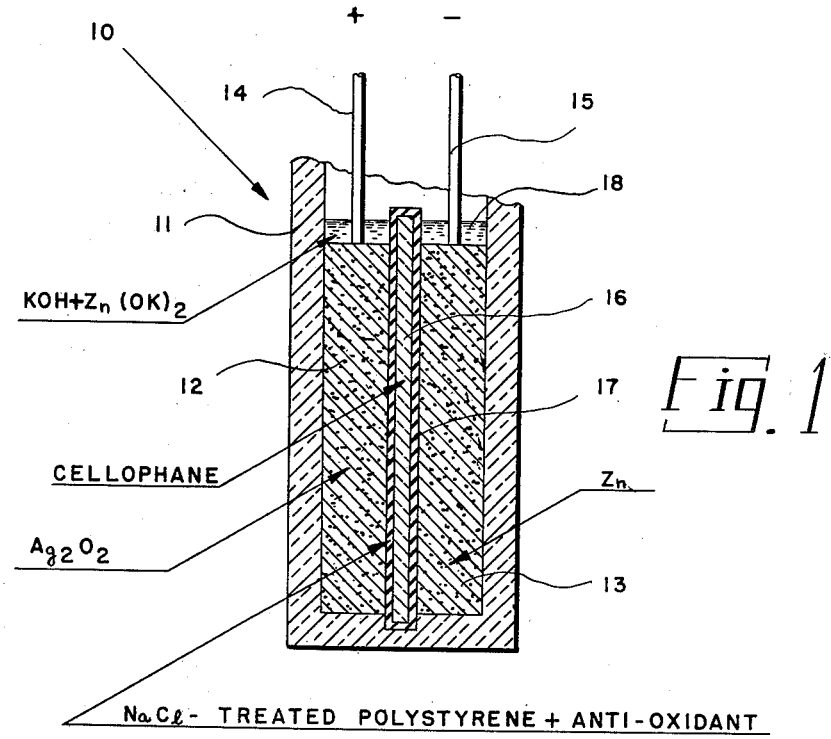
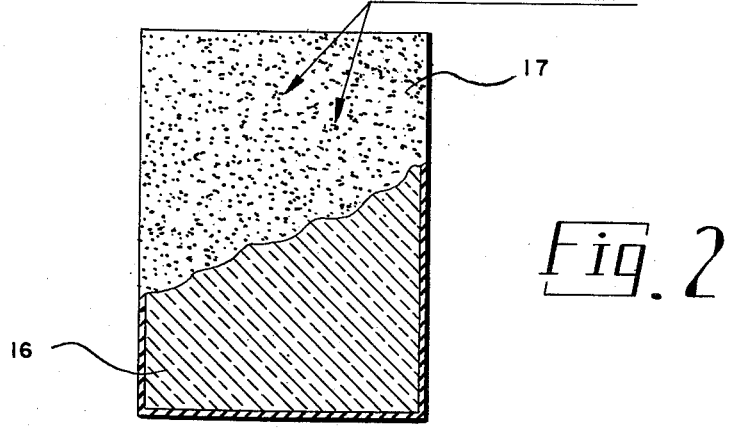
INVENTOR.
MEYER MENDELSOHN
BY
AGENT

United States Patent Office 2,816,154
Patented Dec. 10, 1957

2,816,154

SEPARATOR FOR ELECTRIC BATTERIES

Meyer Mendelsohn, New York, N. Y., assignor to Yardney International Corp., New York, N. Y., a corporation of New York Application October 17, 1951, Serial No. 251,780

2 Claims. (Cl. 136—144)

The present invention relates to electric batteries, more particularly to batteries wherein electrodes of opposite polarity are closely confined in a container and are prevented from contact with one another by the interposition of an electrolyte-permeable separator.

A representative battery of the type referred to is one in which one or more positive electrodes containing silver are juxtaposed with one or more negative electrodes containing zinc, within a casing containing an alkaline electrolyte, the separator comprising one or more layers of a semi-permeable membrane such as regenerated cellulose (cellophane). While such batteries operate generally satisfactorily, especially if the separator is maintained under compression between the electrodes so as to prevent gradual dilation of its pores, it has nevertheless been found that in a rechargeable battery of this type the number of charging cycles is limited by the eventual deterioration of the membrane. Investigations have indicated that the separator material may be subject to both chemical and mechanical attack by the active material of the adjacent electrodes; thus it is now believed that prolonged contact with the positive silver electrode will lead to oxidation of a cellophane layer which in turn weakens the latter sufficiently to make it vulnerable to penetration by charged particles of active material tending to migrate toward the opposite electrode.

In the past the difficulties described have been met by an increase in the number of cellophane layers and also by the interposition of porous spacers between the electrodes and the membrane; all of these measures are, however, only partially effective and, moreover, tend to increase to a not inconsiderable extent the volume, the weight and the internal resistance of the battery.

The present invention has for its general object to provide means for more effectively protecting the semi-permeable separator (e. g. the cellophane membrane) so as to increase the number of charging cycles without objectionable augmentation of volume, weight or internal resistance.

It has been found in accordance with the invention that this object may be realized by incorporating a protective barrier into the separator itself, e. g. by bonding it to the base of semi-permeable material. Thus the barrier may comprise a relatively thin coating of a thermoplastic material applied to a film of cellophane by any suitable process, such as dipping, spraying or calendering. Thermoplastic materials found suitable for this purpose include polystyrene, polyvinyl resins (e. g. polyvinyl acetate) and styrene and butadiene copolymers. Preferably an anti-oxidant is inclined in the protective coating.

Since the protective barrier is supported by the semi-permeable base, its thickness may be so small as to reduce the normally high resistance of the thermoplastic material to tolerable magnitudes. This resistance may, however, be further reduced to a surprising extent by treating the material with a suitable modifier such as, for example, the salt sodium chloride or potassium chloride. The invention, accordingly, also provides a process for protecting a semi-permeable separator by modifying a thermoplastic material to lower its resistance and coating the separator with the so modified material.

According to a further feature of the invention the protective action of the barrier may be obtained or promoted by making said barrier in the form of a coating serving as the carrier of an ion exchanger adapted to prevent the intrusion of harmful charged particles. It has been found that both cation and anion exchangers will have this effect. With a cation exchanger, which may be, for example, of the form R—SO$_3$K (R being a radical), the following reaction is believed to take place:

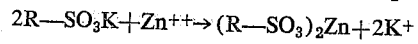

thus the zinc ions are intercepted and their charge is transferred to potassium molecules which pass harmlessly through the separator.

With an anion exchanger having the form R—OH, for example, the reaction may be as follows:

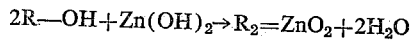

and/or

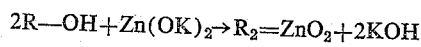

thus the ion exchanger may bind the zinc which may have lodged at or near the separator early in the discharge cycle and which has subsequently become converted to its hydroxide or its zincate, thereby preventing this zinc from thereafter forming charged particles capable of penetrating the semi-permeable material.

The conventional use of ion exchangers has been limited to irreversible processes, such as purification treatments, where it is necessary from time to time to remove the ion exchanger from the medium under treatment in order to regenerate the exchanger for further use. When, in accordance with the present invention, an ion exchanger is placed in the electrolytic circuit of a battery, the alternate charging and recharging of the battery may obviate the need for a separate regeneration treatment and may thus enable the exchanger to be used for an indefinite period.

Ion exchangers commercially available at present, e. g. a sulfonated styrene cation exchange resin marketed under the name "Permutit Q," are granular solids which in accordance with the invention may be incorporated in the thermoplastic material used as a protective barrier before the latter is applied to the separator base; they may, however, also be incorporated into the semi-permeable base material itself, e. g. into the cellophane during the regeneration process.

The accompanying drawing shows by way of example a zinc-silver battery embodying the invention. In the drawing:

Fig. 1 is a longitudinal section through a battery casing, showing two electrodes and a protected separator therebetween; and Fig. 2 is a front elevation, partly in section, of the separator of Fig. 1.

Fig. 1 shows a battery 10 comprising a casing 11 having inserted therein a positive electrode 12 and a negative electrode 13; when the battery is charged, these two electrodes consist, esssentially, of silver peroxide Ag$_2$O$_2$ and of metallic zinc, respectively. A positive lead 14 and a negative lead 15 emerge from the corresponding electrodes.

Interposed between the electrodes 12, 13 is a semi-permeable separator comprising a cellophane sheet 16 bearing a protective coating 17 of modified thermoplastic material, e. g. of NaCl-treated polystyrene. Imbedded in this coating, as illustrated in Fig. 2, are the granules of an ion exchanger which may be of either the anionic or the cationic type as hereinabove described. The assembly 12, 13, 16, 17 is permeated by an alkaline electrolyte 18 which may be potassium hydroxide with a strong concentration of potassium zincate. The cellophane 16, when exposed to the electrolyte, tends to swell but finds its expansion limited by the walls of the casing 11, whereby the electrode assembly and the separator are placed under compression. The coating 17, which may contain an anti-oxidant (e. g. hydroquinone), protects the sheet 16 from direct contact with the oxidized silver electrode, thereby minimizing the danger of chemical attack from this direction upon the cellophane. At the same time the coating, with its ion exchange particles imbedded therein, absorbs or repels zinc ions arriving from the electrode 13 (and probably also silver ions emitted by the electrode 12), thereby protecting the cellophane from mechanical penetration liable to short-circuit the battery.

The treatment of the thermoplastic material with sodium chloride or potassium chloride has been found to lower its electric resistance to such a degree that the resulting resistivity of the coating 17 will be of the order of or less than that of a cellophane layer of like thickness. It may be mentioned, however, that the presence of the ion exchanger itself is effective to lower the resistance of the thermoplastic material, even without preliminary treatment of the latter by a modifying agent.

It should be understood that the principles of the invention disclosed hereinabove may be utilized in various ways and that the specific arrangement illustrated in the drawing may be modified without thereby departing from the scope of the invention as defined in the appended claims. In particular, the use of an ion exchanger is not limited to instances where such exchanger can be incorporated in a support of layer or sheet form but, at least according to the broader aspects of the invention, the element or elements containing the ion exchangers may be of any convenient form and need not necessarily be in contact with an electrode.

I claim:

1. A separator for a battery with a liquid electrolyte, comprising a layer of semi-permeable sheet material swellable in said electrolyte and a coating of thermoplastic material on said layer, and means including an ion exchanger in said coating for lowering the resistance of said coating to electrolytic penetration to not more than substantially the resistance of said sheet material.

2. A separator according to claim 1, wherein said sheet material is regenerated cellulose and said thermoplastic material is polystyrene.

References Cited in the file of this patent

UNITED STATES PATENTS

| | | |
|---|---|---|
| 1,366,223 | Wales | Jan. 18, 1921 |
| 1,403,577 | Steerup | Jan. 17, 1922 |
| 1,570,062 | Hoffman | Jan. 19, 1926 |
| 1,574,844 | Oppenheim | Mar. 2, 1926 |
| 1,732,140 | Pederson | Oct. 15, 1929 |
| 2,086,544 | Dreyfus | July 13, 1937 |
| 2,209,965 | Finzel | Aug. 6, 1940 |
| 2,393,967 | Brubaker | Feb. 5, 1946 |
| 2,400,091 | Alfthan | May 14, 1948 |
| 2,514,415 | Rasch | July 11, 1950 |
| 2,534,336 | Cahoon | Dec. 19, 1950 |
| 2,593,540 | Cornwell | Apr. 22, 1952 |
| 2,594,710 | Andre | Apr. 29, 1952 |
| 2,594,711 | Andre | Apr. 29, 1952 |
| 2,594,713 | Andre | Apr. 29, 1952 |
| 2,607,809 | Pitzer | Aug. 19, 1952 |
| 2,635,127 | Yardney et al. | Apr. 14, 1953 |
| 2,636,851 | Juda | Apr. 28, 1953 |

FOREIGN PATENTS

| | | |
|---|---|---|
| 565,871 | Great Britain | Dec. 1, 1944 |

OTHER REFERENCES

Printed Circuit Techniques Bureau of Standards Circular 468, 1947, pages 6 and 7.

Technical Reviews, vol. 97, No. 7, July 1950, page 148c.